United States Patent [19]

Losio

[11] Patent Number: 4,533,261
[45] Date of Patent: Aug. 6, 1985

[54] FLANGED HALF-BEARING FOR MOTOR APPLICATIONS

[75] Inventor: Gastone Losio, Trento, Italy

[73] Assignee: Clevite S.r.l., Trento, Italy

[21] Appl. No.: 575,778

[22] Filed: Feb. 1, 1984

[30] Foreign Application Priority Data

Feb. 3, 1983 [IT] Italy .................... 84909 A/83

[51] Int. Cl.$^3$ .................. F16C 13/04; F16C 33/04
[52] U.S. Cl. .................... 384/296; 308/54; 384/129
[58] Field of Search ........... 384/428, 129, 295, 296; 308/53, 54, 55, 56, 57, 79.1

[56] References Cited

U.S. PATENT DOCUMENTS

| | | | |
|---|---|---|---|
| 838,925 | 12/1906 | Walsh | 308/56 |
| 1,121,849 | 12/1914 | Kralund | 308/56 |
| 3,713,714 | 1/1973 | Hill et al. | 384/294 |
| 4,017,127 | 4/1977 | Smith et al. | 384/294 |
| 4,076,342 | 2/1978 | Thorpe | 384/129 |
| 4,133,586 | 1/1979 | Maurer | 384/429 |

FOREIGN PATENT DOCUMENTS 1297559 11/1972 United Kingdom .
1386253 5/1975 United Kingdom .

Primary Examiner—Stuart S. Levy
Assistant Examiner—Lynn M. Sohacki
Attorney, Agent, or Firm—Russell E. Baumann

[57] ABSTRACT

This invention concerns a flanged half-bearing for motor applications. This half-bearing is of the type consisting of a semi-cylindrical shell, provided with half thrust washers suitable for the axial registering of the shaft, and reacting, therefore, to axial loads.

The connection between semi-cylindrical shell and washers is obtained by hooking appended parts, substantially in convex prism form, present on each washer, between corresponding cavities arranged on the curved edges of the shell. Based on the angle position of the cavities, in relation to the axial plane of symmetry of the shell, and based on the shape of the cavities themselves and of the relative appendages, providing a slight interference in the coupling phase between shell and washer, and taking advantage of the flexibility of the shell, when mounted on the support, a coupling between shell and washer is obtained, which is stable before mounting in place and movable, circumferentially and axially, when mounted on the relative support. The inactivity of the hooking connection between shell and supports after mounting in place, permits the ideal adjustment of the supports themselves, axially and circumferentially.

7 Claims, 11 Drawing Figures

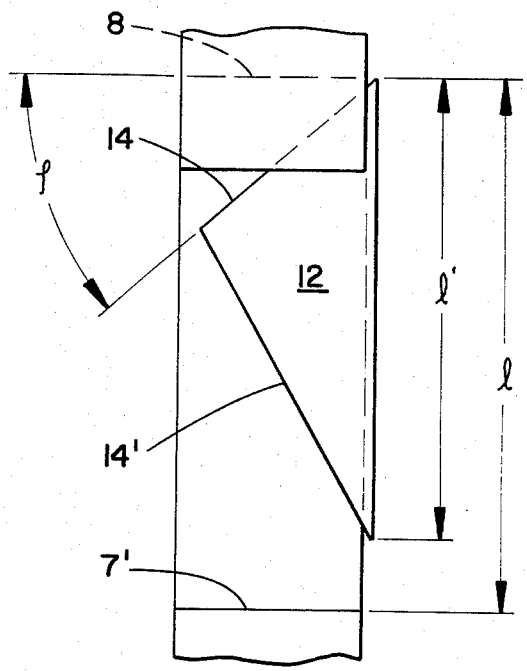
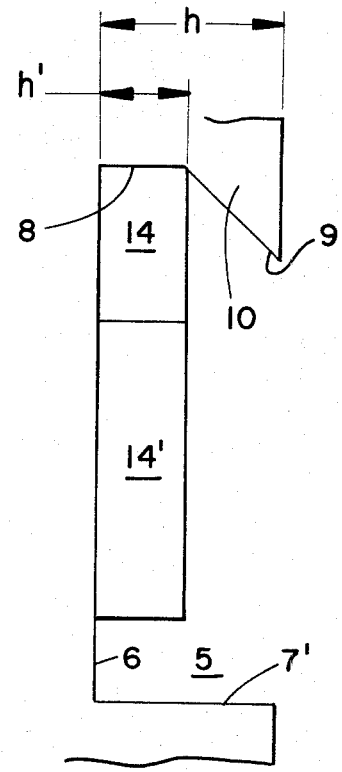
FIG. 8a  FIG. 8b
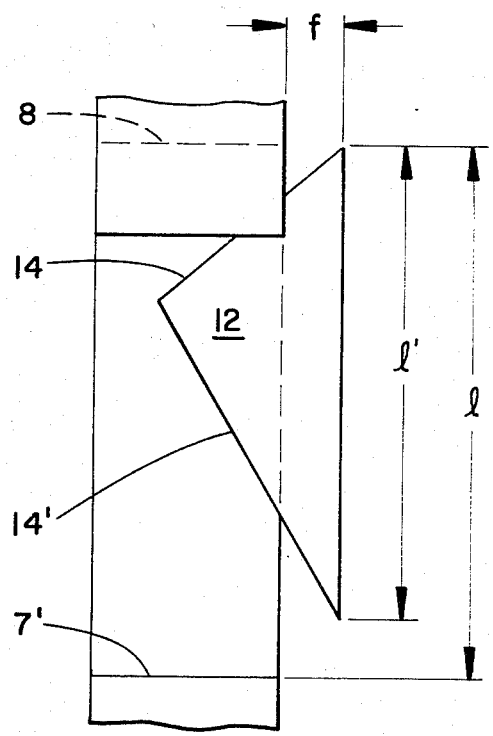
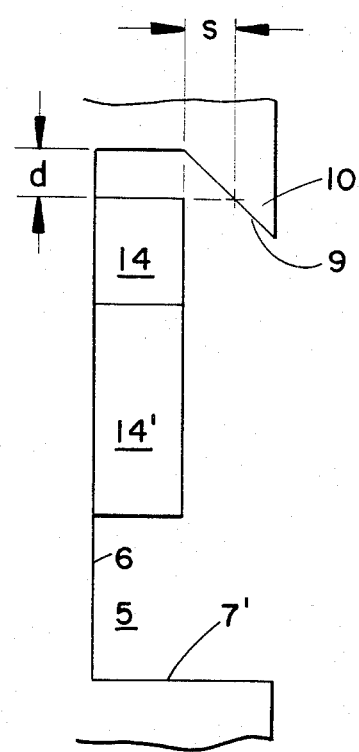
FIG. 9a  FIG. 9b

FLANGED HALF-BEARING FOR MOTOR APPLICATIONS

DESCRIPTION

The half-bearing of the present invention is designed especially, although not exclusively, to be used in the motor field. More particularly, it is part of a bearing of radial type, provided with frontal half thrust washers for the purpose of registering the axial position of the shaft, and thus reacting to axial loads.

As we know, the two semi-cylindrical shells forming such bearings are each lodged in a relative support through a slight interference.

At present, according to the State of the Art, the said half-bearings may be classified, essentially, in two main types: a first type, consisting of a single piece, in which the frontal washers are formed of plastic deformations (hollows) of the curved edge of the shell itself, and a second type, in which the washers, made separately, are fixed rigidly to the shell by frames of the "swallow tail" type or similar.

Such half-bearings of the known type show difficulties and disadvantages of various kinds.

The first type means, above all, high costs of manufacture: through the hollowing phase, namely, relatively complicated apparatus is necessary, which requires great investment cost; moreover, the half-bearings obtained in this way require additional finishing (e.g., introducing undercutting in the edges between the washers and shell because of the presence of sharp points on the supports) which have a further effect on production costs. From a technical standpoint, the main disadvantage of such half-bearings consists of the inevitable presence of axial play between the thrust washers backing and sides of the support. Under such working conditions, as we known, there is an irregular wear on the washers themselves and, above all, a concentration of tensions (due to the axial thrust of the shaft), located in the zone of joining between backing and shell which, in the long run, may cause the failure of the antrifriction material. The second type overcomes, in part, the above disadvantages. In fact, the plastic deformation operation is eliminated, as well as the finishing work on the washers backing, these latter having flat surfaces which do not collide with any sharp points on the support. There is provided, on the other hand, the phase of rigid fixing of the washers to the shell, which is done by pressure exerted mechanically, in the axial direction, simultaneously with a plastic deformation of the shell, as well as finishing phase of the junction zone of the frames. In this case, also, therefore, there are relatively high manufacturing costs. From a functional standpoint, such half-bearings have disadvantages similar to those mentioned above, because of the play in the coupling between washers and support. In both cases, harmful local tensions are shown because of the rigidity of the connection between thrust washers and half-bearing shell.

The main purpose of this invention, therefore, is to obtain a flanged half-bearing which permits overcoming the said disadvantages, relative to the State of the Art, eliminating totally the local tensions in the joining zone between washers and shell and permitting the adjustment in place of the washers themselves, all this, with great reduction of construction costs. The problem on which the present invention is based is to obtain hooking connections between washers and shell which will be "active" (stable couplings) during the phases of transport and of installation of the bearing and "inactive" (partially mobile coupling) later when mounted in place on the relative support, in order to permit the adjustment of the washers, both circumferentially and axially.

This problem is solved, according to the present invention, through a flanged half-bearing of the type which consists of an essentially semi-cylindrical shell, which can be fixed to a relative support with slight interference between shell and support, to which is connected at least one axial thrust washer, the curved edge of the said shell, adjacent to the said washer, being provided with at least two cavities, arranged symmetrical to the axial plane of symmetry of the said shell, the said cavities being suitable to receive corresponding hooking appendages present on the inner curved edge of the said washer, with the distinction that each of these cavities has at least one side wall partly inclined in relation to the generatrices of the said shell and that each of the said appendages is substantially in the form of a convex prism, an interference being provided between one surface of the said convex prism and the said side wall of the said cavity, so that, before the coupling of shell and washer, the angle at the center of curvature $\alpha$ included between these cavities is less than the angle at the center $\alpha'$ included between the said appendages, this angle $\alpha$ increasing and remaining less than the said angle $\alpha'$ during the coupling of shell and washer, before the said half-bearing is mounted in place, the said angle $\alpha$ being almost equal to the said angle $\alpha'$ after the said half-bearing is mounted in place, through the centripetal compression exerted by the said support against the said shell, this coupling between shell and washer being stable before the said half-bearing is mounted in place, and partly mobile, circumferentially and axially, after the mounting on the said support.

Further characteristics and advantages of the present invention will be more evident from the description in detail which follows, of one preferred mode of execution, illustrated purely by way of example and without intent to limit, in the attached drawings, in which:

FIGS. 8a and 8b show, in diagram, respectively, the axial and radial view of the hooking appendage between the cavities, in the phase before the mounting of the half-bearing on the support.

FIG. 9a shows schematically the axial view of the hooking appendage within the cavity after mounting the half-bearing on the support;

FIG. 9b shows the radial schematic view, corresponding to the position of FIG. 9a, of the position of the appendage within the cavity.

With reference to the attached drawings, 1 is a substantially semi-cylindrical shell, known per se, constituting half of a radial sleeve bearing for motor shafts. To the shell 1 is connected a pair of washers 2 (axial thrust) of substantially half-ring form, with the function of registering the axial position of the shaft, thus reacting to axial loads.

Figure 1:
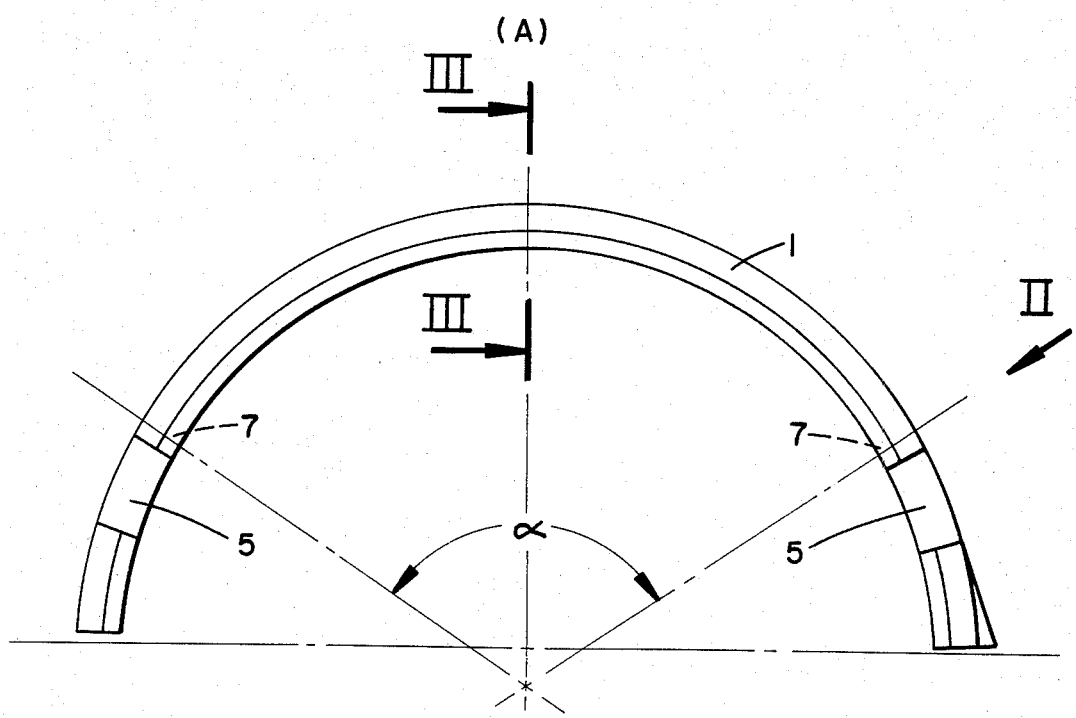
FIG. 1 shows the axial view of the substantially semi-cylindrical shell before coupling with the washers.
Figure 2:
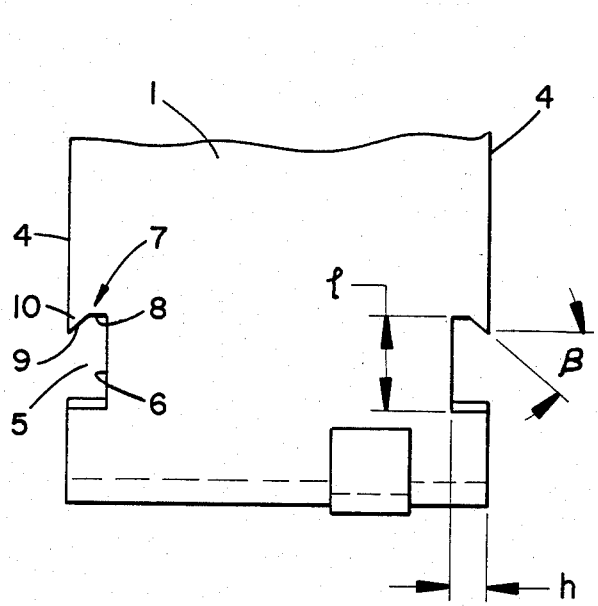
FIG. 2 shows the radial view of the shell along direction II of FIG. 1.
Figure 3:
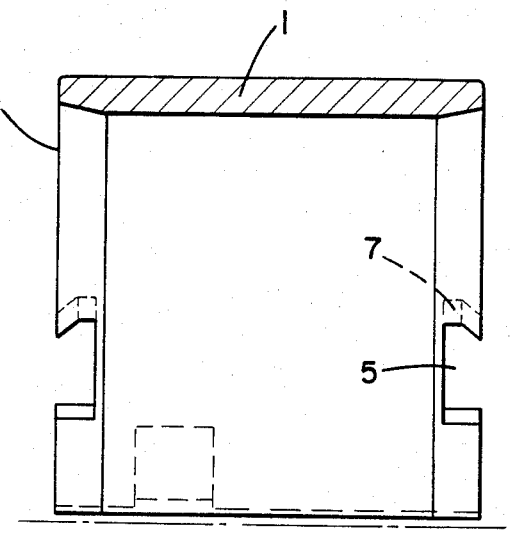
FIG. 3 shows the view in section of the shell, along the line III—III of FIG. 1.
Figure 6:
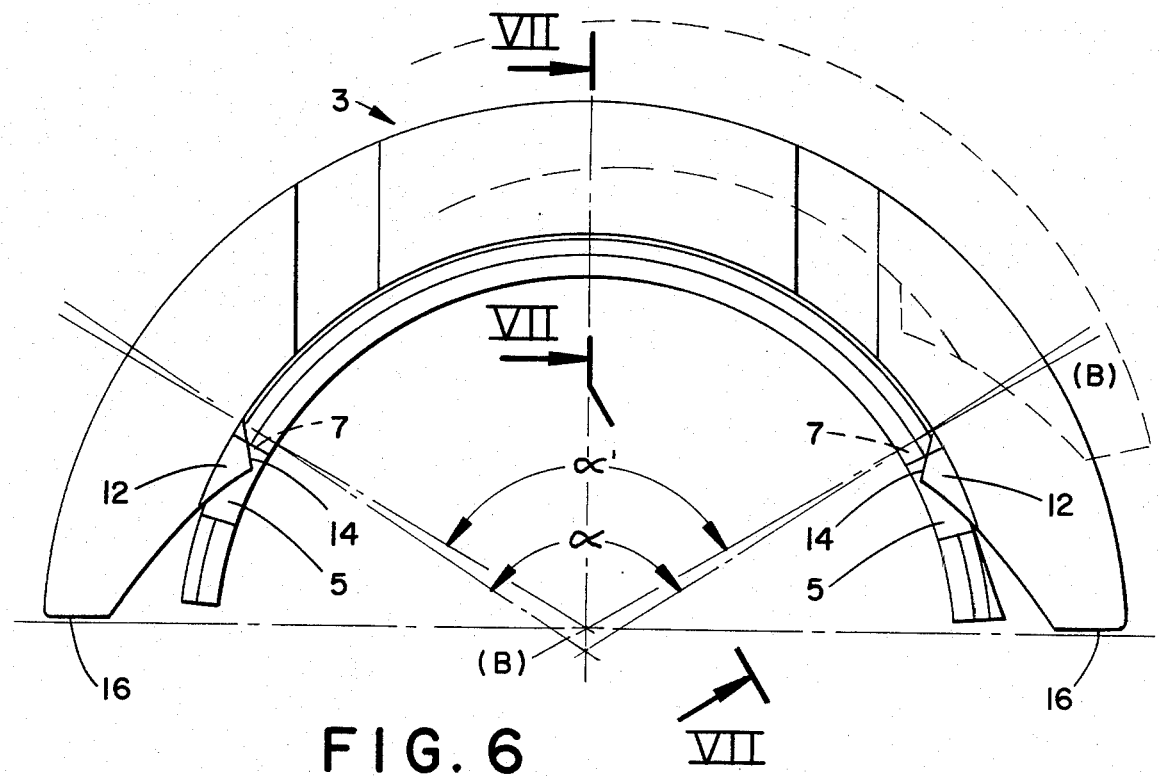
FIG. 6 shows the axial view of the half-bearing before mounting in place, and, in broken line, the hooking position of the washer.
Figure 7:
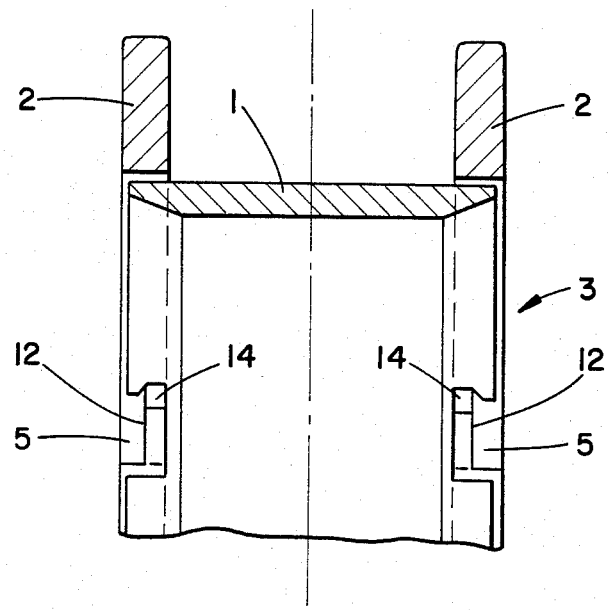
FIG. 7 shows the section of the half-bearing, along the line VII—VII of FIG. 6.

The half-bearing so constituted, indicated by 3 in FIGS. 6 and 7, is designed to be attached to a relative support (not indicated in the figure) giving a light interference to the shell-support coupling. The shell 1 has on each curved edge 4, a pair of cavities 5 with flat bottom 6, arranged symmetrical in relation to the axial plane of symmetry A of the shell 1. Each of these cavities 5 has a side wall 7 partly inclined in relation to the generatrices of the cylindrical surface of the shell 1. More precisely, the side wall 7, in its lower portion 8, is parallel to the said generatrices and, in its upper portion 9 (with height equal to the lower portion 8), inclined inward from the cavity 5 by an angle $\beta$ equal to about 45° (FIG. 2) and thus forming a projection 10, extending inside the cavity 5. The lower portion 8 of the two cavities 5, symmetrically arranged in relation to the axis A, describe an angle at the center (center of curvature), $\alpha$, equal to about 120° (FIG. 1).

Figure 4:
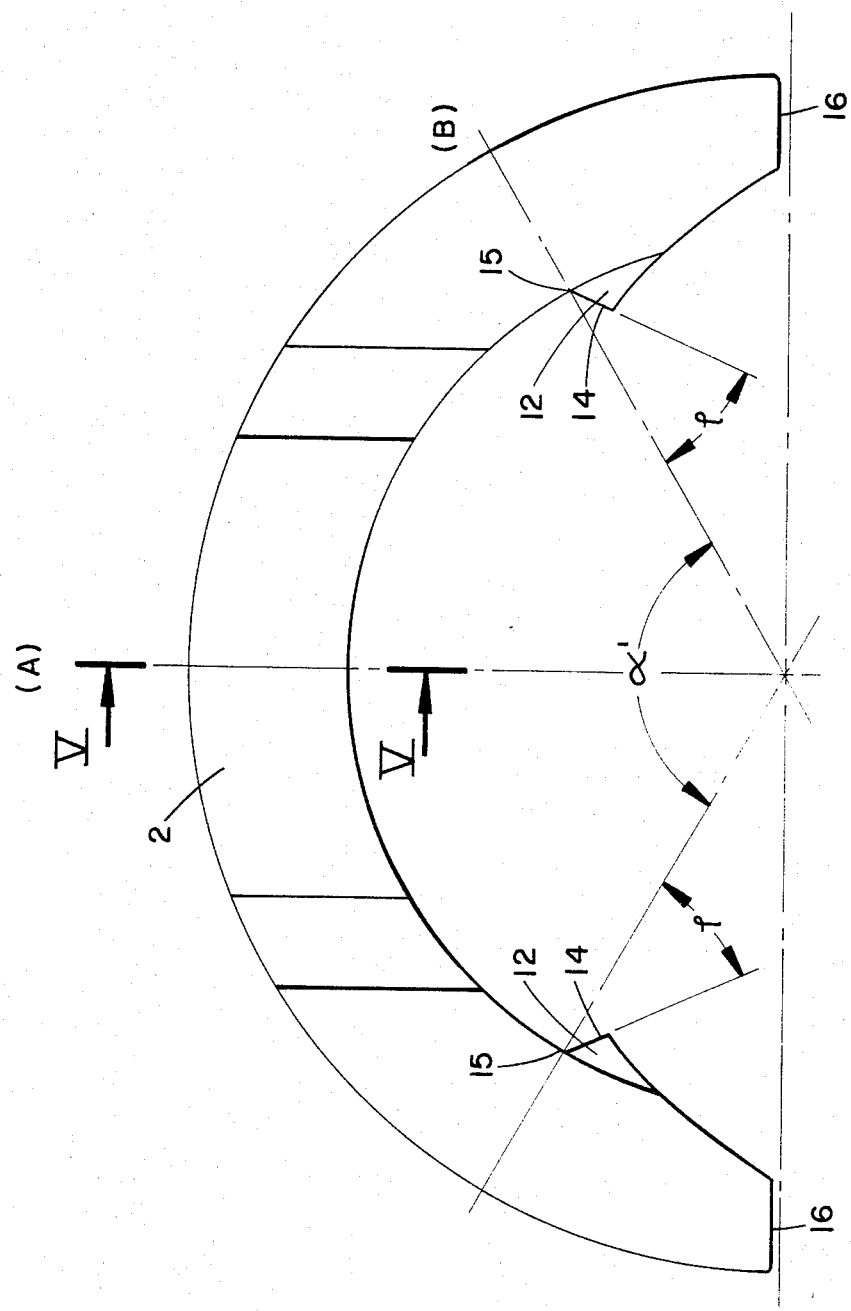
FIG. 4 shows the plane (axial) view of a washer.
Figure 5:
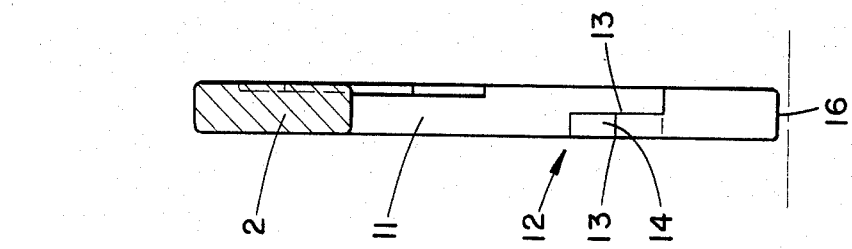
FIG. 5 shows the section of the washer along the line V—V of FIG. 4.

With particular reference to FIGS. 4 and 5, each washer has, on its inner curved edge 11, a pair of molded hooking appendages 12, arranged symmetrically with a plane of symmetry which, with shell and washer coupled, coincides with the plane A. Each of these appendanges 12 is in the form essentially as a prism and can be inserted into the corresponding cavity 5 of the shell 1. More particularly, this prism has bases 13 substantially triangular and has one surface 14, turned back toward the plane A, lying in a plane parallel to the generatrices of the shell and inclined by an angle $\phi$ (the value of which will be defined later) in relation to the axial plane B passing through the angle 15 formed by the surface 14 and the curved edge 11. The corners 15 of the two appendages 12 make central angle $\alpha'$, equal to about 120°, possibly different under certain conditions (as will be explained later) from the angle $\alpha$. From a dimensional standpoint, the height l', in the circumferential direction, of each appendage 12 is less than the corresponding length l of each cavity 5 and has a thickness half the thickness of the washer 2, as can be seen in FIG. 5 which corresponds to h' as shown in FIG. 8b.

For the purposes of this invention, of fundamental importance is not only the shaping of the elements described above, but also, and above all, the mutual position of shell and washer under the various conditions of connection because of the varying of the geometry of the shell itself, and consequently of the angle $\alpha$, as a result of the bending produced on the shell 1 by centripetal compression forces, first by each washer and then, under conditions of mounting, by the support.

The hooking of each washer 2 to the shell 1 takes advantage of the characteristics of elasticity of the shell 1 itself. In the phase before the coupling of shell with washer, the angle $\alpha$ (which is the angle at the center of curvature of the shell) is less than the angle $\alpha'$ ($\alpha'$ has a constant value, thanks to the rigidity against radial bending of the washer 2); there is provided, in fact, an interference of coupling between the surface 14 of an appendage 12 and the lower portion 8 of the side wall 7 of the cavity 5. In the phase of hooking a washer 2 to the shell 1, such interference determines the bending in centripetal direction, of the shell 1, so that the appendage 12 can enter freely (with spring action) into the cavity 5; under these conditions, the angle $\alpha$ increases to become almost equal to the angle $\alpha'$. In reality, once the hooking is done, the angle $\alpha$ will return to slightly less than $\alpha'$ (through the elasticity of the shell 1), in this way giving stability to the shell-washer coupling. From an operative standpoint, the hooking phase may preferably take place as follows (as shown in FIG. 6): An appendage 12 being inserted in the corresponding cavity 5 (at left, in FIG. 6), the washer 2 is rotated clockwise, balancing in the contact zone between the surface 14 and the portion 8 of the wall 7 (at right, in the figure); thanks to the interference mentioned above, the surface 14 of the appendage 12 (at right, in figure) will cause the bending of the shell 1 in centripetal direction (with the consequent increase of the value of $\alpha$) and, having overcome the spring point, the appendage 12 of itself, will enter the cavity 5.

Because of the structural characteristics (invariable), of the shell 1 and the washer 2, respectively, there is defined a ratio between the value of the angles $\alpha$ and $\phi$ so as to permit the optimal hooking between the two elements. These angles must satisfy the empirical relation $\phi + (180 - \alpha)\frac{1}{2} < 90°$, which permits avoiding the slipping of the washer 2 radially along the plane A. Preferably, $\phi$ should be about 35° to 38° for a value of $\alpha$ equal to about 120° (as already pointed out).

FIGS. 8a and 8b illustrate schematically the position of the appendage 12 within the cavity 5 in the condition of stable coupling between shell and washer. In such conditions, the hook joinings are "active" and the half-bearing 3 acts as a single body. Therefore, it can be carried and moved without danger of accidental uncoupling of the parts (shell and washer) composing it. Referring to FIGS. 8a and 8b, we see how the two walls 14' and 7', respectively, of the appendage 12 and the cavity 5, do not interfere in the least with the purpose of the coupling of shell and washer, because of the symmetry of the two appendages 12 on the washer 2.

In the next phase, of mounting the half-bearing 3 on the support, there is provided, as already mentioned, a slight interference to the shell-support coupling, so as to permit the fastening in place of the half-bearing 3 itself. This interference causes a compression, in the centripetal direction, of the shell 1, which produces, as effect, the mutual approach of the cavities 5 ($\alpha$ increases slightly); since each washer 2 behaves rigidly, this results in a relative displacement in the radial direction toward the outside of the corresponding appendages 12, in relation to the cavities 5. This situation is illustrated schematically in FIGS. 9a and 9b.

The partial removal of each appendage 12 from the corresponding cavity 5 in the radial direction, gives rise to an axial play s and a circumferential play d (FIG. 9b) between appendage 12 and cavity 5. Consequently, because of the symmetry of the appendages 12, each washer 2 is able to make small axial and circumferential displacements in relation to the shell 1, and the support. The lower portion 8 and the upper portion 9 of the side wall 7 of the cavity 5 becomes, therefore, barring surfaces in relation to circumferential and axial displacements of the washer 2 in relation to the shell 1.

It should be noted that the value of the plays s and d mentioned above depends on the play f, (FIG. 9a) existing between the curved edge 11 of the washer 2 and the shell 1. This play (which, in practice, is translated into a difference of diameter between the edge 11 and the shell 1) is predetermined in the planning office.

The hooked joinings are, therefore, "inactive"; the circumferential mobility allows the washer 2 to be adjusted automatically, striking by its ends 16 against the stop surface on the support; the axial mobility allows the washer 2 to be adjusted against the corresponding side flank of the support. Under these conditions, the axial loads of the shaft on the washer 2 cannot create concentration of tensions on the washers, and on the connections joining support and shell, these connections being totally inactive.

It should be noted that, in the phase before complete assembly of the motor, the coming out, in the axial direction, of the appendages 12 from the cavities 5 is prevented by the projection 10; excessive circumferential displacements of the washer 2 (in the absence of checking surfaces at the end 16) are constrained, according to the direction of rotation, by one or the other of the two stop surfaces 8 present in the cavities 5.

The invention achieves, therefore, the purposes proposed. Obviously, it may take in its practical execution forms different from that described above; in particular, many changes may be made of a practical and/or functional nature which will appear evident to an expert in the sector, without, for that reason, leaving the scope of protection of the present patent right.

What is claimed is:

1. A flanged half-bearing for motor applications comprising a substantially semi-cylindrical shell adapted to be fixed to a relative support with slight interference between said shell and said support, at least one axial thrust washer with generally prism-shaped hooking appendages for attachment to said shell, said shell having a curved edge in which is provided at least two cavities arranged symmetrically in relation to the axial plane of symmetry of the shell for receiving hooking appendages of said washer wherein each of said cavitites has at least one side wall having a lower part and an upper part, in which the lower part is parallel to the generatrices of the shell and the upper part is inclined toward the center of the cavity as it extends outward, the cavity having a length, in the circumferential direction, greater than the corresponding length of the appendages and partly inclined in relation to the generatrices of the shell, and a configuration such that, prior to coupling the shell and the washer, the angle at the center of curvature $\alpha$, included between the cavitites, is less than the angle $\alpha'$ at the center, included between the appendages, the angle $\alpha$ increasing and remaining less than the angle $\alpha'$ during coupling of shell and washer, and the angle $\alpha$ becoming nearly equal to the angle $\alpha'$ after mounting of the half-bearing on the support by the circumferential compression action of the support on the shell, thereby providing for the shell coupling being stable before mounting on said support and partially mobile both circumferentially and axially after mounting on said support.

2. The half-bearing according to claim 1, with the distinction that the surface of the prism appendage lies in a plane parallel to the generatrices of the shell in assembly and is inclined at an angle $\phi$ in relation to the axial plane passing through the angle made by said surface and a plane tangent to the curved inner edge of the washer.

3. The half-bearing according to claim 2, with the distinction that the angle $\alpha$ and the angle $\phi$ must satisfy the relation $\phi + (180° - \alpha)1.2 < 90°)$.

4. The half-bearing according to claim 2 with the distinction that $\phi$ is approximately 35° to 38° and $\alpha$ is about 120°.

5. The half-bearing according to claim 1 with the distinction that the appendage has a thickness, in the axial direction, corresponding to the lower part of the side wall of the cavity.

6. The half-bearing according to claim 1 with the distinction that the lower portion of the side wall is about half the depth in the axial direction of the cavity, and that the inclination of the upper part of the side wall is about 45° in relation to one generatrix of the shell.

7. The half-bearing according to claim 1 with the distinction that the prism-shaped appendages are essentially right prisms.

* * * * *